March 16, 1954     W. A. HOHMES     2,672,103
SAFETY CRASH HANDLE
Filed Feb. 16, 1951

INVENTOR.
WILLIAM A. HOHMES
BY Howard J. Whelan.
ATTORNEY

Patented Mar. 16, 1954

2,672,103

UNITED STATES PATENT OFFICE 2,672,103

SAFETY CRASH HANDLE

William A. Hohmes, Baltimore, Md.

Application February 16, 1951, Serial No. 211,303

6 Claims. (Cl. 105—354)

This invention relates to handles and more particularly to those suitable for preventing injury to passengers in vehicles in case of a collision, or an accident tending to upset the vehicle.

It has for an object the provision of a shock absorbing handle that can be attached to the dashboard or back of the front seat or other suitable location in a vehicle to take up the effects of a collision when a passenger is thrown about and has an opportunity to grasp the handle.

Another object of the invention is to provide a new and improved crash handle for a motor vehicle that is adjustable in various ways to enable it to fit the location selected and meet the stresses imposed upon it as the passenger uses it in a collision.

A further object of the invention is to provide a new and improved crash handle capable of effectively meeting the requirements that it is subject to, simple and attractive in structure and economical to make.

Additional objects will be evident as the details of the invention are explained.

For a better understanding of the invention, and the objects thereof, reference is made to the accompanying drawings. These drawings when used in conjunction with the following description outline a particular form of the invention, while the claims emphasize the scope thereof.

In the drawings.

Similar parts throughout the drawings are designated by the same reference numbers.

Figure 1:
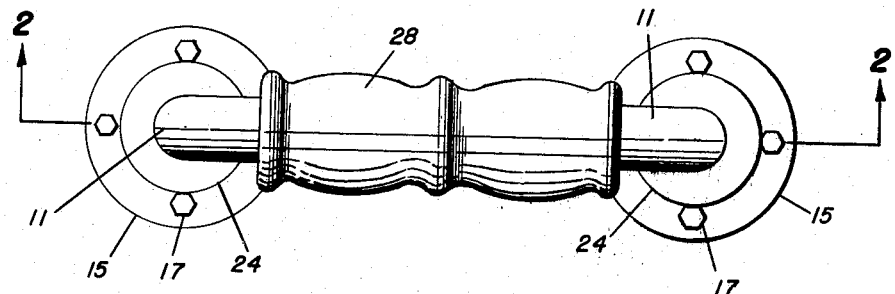
Figure 1 is a side elevation of a safety crash handle, embodying this invention.
Figure 2:
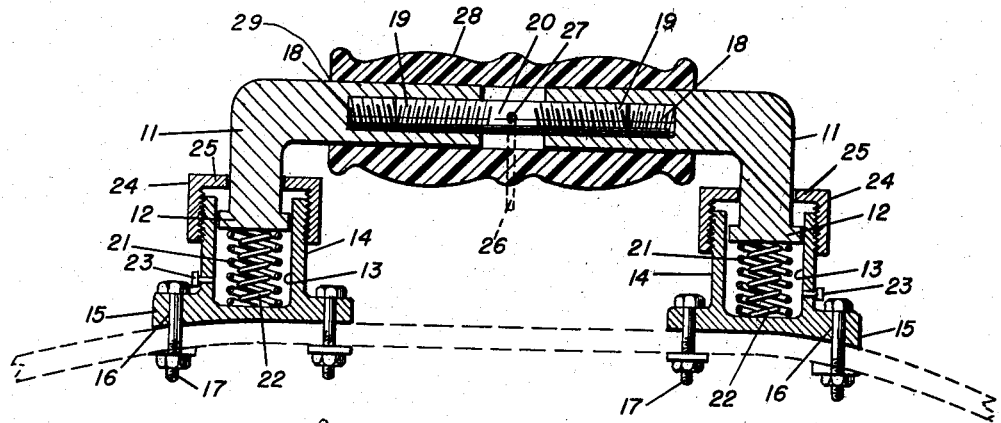
Figure 2 is a sectional view taken along line 2—2 of Fig. 1.
Figure 3:
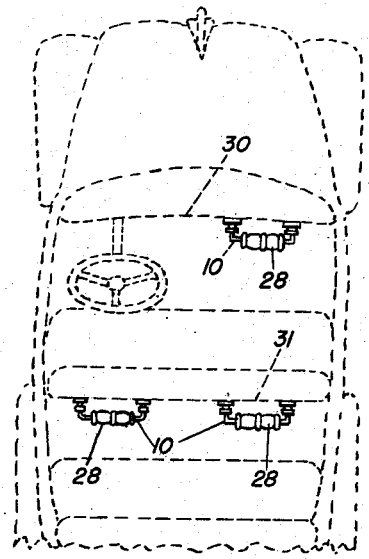
Figure 3 is a plan view of an automobile equipped with the safety crash handle shown in Fig. 1.

In the construction shown in the drawings, a crash handle 10 consists of a pair of elbow members 11 made of solid rigid material of considerable strength. One of the end portions of each elbow is enlarged to form a disc 12 peripherally surrounding it and adapted to sit closely in the cylindrical bore 13 of a supporting bracket 14. Each bracket 14 has an enlarged circular base 15 perforated with holes 16 spaced suitably apart for holding bolts 17. The bolts 17 are used to attach the handle securely to the dashboard 30 of a vehicle or to the back of the front seat 31 thereof. Or it may be attached to any other suitable location. The opposite end portion of each elbow 11 is provided with a screw threaded hole 18 axially disposed therein. The hole 18 in one elbow is tapped for a right hand screw thread while the other is for a left hand screw thread. In to these holes 18 are screwed the screw end portions 19 of a turn-buckle type bolt or cross bar 20. The bolt or cross bar 20 extends the elbows 11 away when turned in one direction and pulls them together in the opposite direction because of the left hand and right hand arrangement. The solid disc portion 12 of the elbows is arranged to fit into bores 13 and reciprocate therein under pressure and pull. The pressure is resisted by a compression spring 21 freely mounted in each bore 13 while the pull is resisted by a tension spring 22 having its opposite ends secured to the face of the disc 12 and to the inner bore 13 of the bracket 14, respectively, by welding. In addition the pressure is resisted by the air cushions inside the bore 13 which is allowed to leak out through adjustable valves 23. A stuffing box union 24 preferably without a gasket is screwed on each bracket 14 and serves to prevent the elbow therein from being pulled out of the bracket. The disc 12 comes prevent this. The bolt 20 is turned and adjusted by a removable pin 26 inserted in a transverse passage 27. This avoids the need of a wrench or other cumbersome tool.

The bolt or crossbar 20 is surrounded by a rubber-like sleeve 28 of suitable design which fits loosely and has holes 29 in its end walls that align and loosely fit over the ends of the elbow members 11 and provided with the passage 27 for the placement of the pin 26.

The operation of the device is simple. In case of collision the passenger reaches out to the rubber-like sleeve 28 of handle 10 in front of him and is pushed against it. The handle is pushed in against the resistance offered by springs 21 and air cushion in the bores 13 and absorbs the shock to an appreciable amount. An instant later, the user may be thrown back and holding on to the handle sleeve will cause it to tension the springs 22 and thus take up the shock in that direction and prevent the passenger from being hurled back and injured.

The device is simple but effective. It has adjustability which is important, as it enables its placement to be accommodated to many practical conditions that its use may involve. Its parts are accessible and the cost of making the items can be kept low.

While but one form of the invention is disclosed in this application, it is not desired to limit the structures made to this specific design as it is appreciated that other forms could be made that would employ the same principles and come within the scope of the appended claims.

Having thus described the invention what is claimed is:

1. A crash handle for vehicles comprising a U-shaped handle element, a pair of hollow brackets secured to the vehicle, said handle element having each one of its legs slidably received and reciprocably held in each hollow bracket, and means in the hollow brackets for flexibly resisting pushing and pulling movements of the handle element.

2. A crash handle for vehicles as set forth in claim 1 wherein the means for flexibly resisting pushing and pulling movements of the handle elements consists of a pair of springs in each hollow socket one of which is freely carried in the socket and the other of which has its ends secured to the socket and to the leg of the handle element.

3. A crash handle for vehicles as set forth in claim 2 wherein the U-shaped handle element consists of a pair of elbows spaced apart and a turnbuckle connecting said elbows.

4. A crash handle for vehicles as set forth in claim 2 wherein the U-shaped handle element consists of a pair of elbows spaced-apart, a turnbuckle connecting said elbows and a rubber grip surrounding the spaced-apart pair of elbows and the turnbuckle.

5. A crash handle for vehicles comprising a U-shaped handle element, a pair of hollow brackets secured to the vehicle, said handle element having each one of its legs slidably received in each hollow bracket, each leg terminating in an enlarged disc portion, closure means for each hollow bracket adapted to cooperate with the disc portions to prevent removal of the handle elements from the brackets, and cushioning means between said disc portions and the brackets to flexibly resist pushing and pulling of the handle.

6. A crash handle as set forth in claim 5 wherein the cushioning means consist of a spring in each hollow bracket loosely mounted between the disc portion and the bottom of the bracket and another spring having one end secured to the face of the disc portion and to the bottom of the hollow bracket.

WILLIAM A. HOHMES.

References Cited in the file of this patent

UNITED STATES PATENTS

| Number | Name | Date |
|---|---|---|
| 589,874 | Theremin | Sept. 14, 1897 |
| 2,222,950 | Itzcovitz et al. | Nov. 26, 1940 |